United States Patent [19]

Wood et al.

[11] Patent Number: 5,052,626

[45] Date of Patent: Oct. 1, 1991

[54] COOLANT INTRODUCTION IN BLOW MOLDING

[75] Inventors: J. Robbin Wood, Bramalea; Robert R. Maric, Willowdale; Jack E. Hazell, Toronto, all of Canada

[73] Assignee: Union Carbide Canada Limited, Canada

[21] Appl. No.: 549,121

[22] Filed: Jul. 6, 1990

Related U.S. Application Data

[62] Division of Ser. No. 295,494, Jan. 11, 1989, abandoned.

[51] Int. Cl.$^5$ .............................................. B05B 1/14
[52] U.S. Cl. .................................... 239/567; 239/597
[58] Field of Search ............... 239/556, 560, 561, 566, 239/567, 597, 548

[56] References Cited

U.S. PATENT DOCUMENTS

| | | | |
|---|---|---|---|
| 2,356,944 | 8/1944 | Peeps | 239/567 |
| 2,964,248 | 12/1960 | O'Brien et al. | 239/566 X |
| 3,448,482 | 6/1969 | Close | 239/561 X |
| 3,913,845 | 10/1975 | Tsuji | 239/567 X |
| 4,439,401 | 3/1984 | Voll et al. | 239/567 X |

*Primary Examiner*—Andres Kashnikow
*Assistant Examiner*—William Grant
*Attorney, Agent, or Firm*—Sim & McBurney

[57] ABSTRACT

A more efficient cooling of a blow molded thermoplastic article can be achieved by directing sprays of cooling medium against those specific zones of the wall of the article which require a more rapid cooling while avoiding directing the sprays at areas requiring a less rapid cooling. This cooling procedure is achieved using a spray head having a plurality of individual spray nozzles which direct sprays specifically against the areas requiring more rapid cooling.

2 Claims, 2 Drawing Sheets

COOLANT INTRODUCTION IN BLOW MOLDING

This is a division of application Ser. No. 295,494 filed Jan. 11, 1989, now abandoned.

FIELD OF INVENTION

The present invention relates to the blow molding of thermoplastic articles to form a variety of blow molded products, and in particular to the cooling of such articles during their manufacture.

BACKGROUND TO THE INVENTION

In the conventional production of blown plastic forms or articles, an extruded tube (parison) of thermoplastic material which is at a temperature above its melting point, is enclosed in an appropriately-shaped mold and pressurized air is used to expand the parison against the wall of the mold to assume the contour of the mold.

Following completion of the blowing cycle, the temperature of the molded article is decreased by cooling to a level below the melting point of the thermoplastic material at which the formed plastic article retains its shape. The length of time required to effect the cooling often takes up a large proportion of the total time required to complete the molding cycle.

The heat is removed from the blown molded article by a variety of procedures, including through the cooled mold walls and through the use of blowing air as a heat transfer medium. To improve the effectiveness of the heat removal portion of the cycle, refrigerants, usually liquid nitrogen, have been introduced into the plastic form, after it has been blown to the shape of the mold.

The conventional manner of introduction of the refrigerant into the formed article is by injection of a refrigerated gas or liquid refrigerant through the blow pin which is used to introduce the blowing air during the blowing step or through a small tube contained within the blow pin.

The cooling medium either is introduced admixed with air or is separately injected in an undirected manner into the blown article. In all blown articles, there are regions which are thicker than others and hence require more cooling time than the thinner portions. The thicker portions thereby become the limiting factor controlling cooling time.

It has been previously suggested in U.S. Pat. No. 3,488,801 to achieve a more uniform cooling of the blow molded article by employing a needle having an angled end which enables cooling fluid to be directed towards a certain locus of the hot thermoplastic material. The needle may be moved during the cooling operation to direct the cooling fluid towards a plurality of different loci on the interior of the parison by rotating and/or longitudinally moving the needle. In this prior art operation, therefore, while differential cooling may be achieved by directing coolant at specific locations, it is possible to apply additional coolant to only one location at one time.

SUMMARY OF INVENTION

In accordance with the present invention, a novel method of injection of refrigerant into the mold for cooling a parison is provided which directs cooling medium towards the portio· of the article which require a greater degree of cc 1·, and away from those portions of the blown article where crystallinity and/or stiffness are more critical. The combination of these two effects results in an accelerated cooling of the thicker portions of the article which are limiting the cycle time while retaining a high degree of crystallinity, density and/or stiffness in those regions of the product where the property is an advantage in the finished product.

The present invention also provides a novel apparatus for introducing and directing the flow of refrigerating medium to those locations within the blown article where the effect of the refrigerant is most beneficial and away from those locations where rapid cooling may be detrimental by employing a novel injection nozzle.

Accordingly, in one aspect, the present invention provides an improvement in a method of blow molding an article of thermoplastic material by blowing the article in a mold of the desired shape with the article having a non-uniform wall thickness and cooling the blown article by introducing a cooling medium to the interior of the article to a temperature whereat the article is self-sustaining and can be removed from the mold.

The improvement of the present invention is wherein the cooling medium is introduced to the interior of the article in such a manner as to effect a directed cooling to thicker areas of the wall of the article and a less rapid cooling to thinner areas of the wall of the article, so as to decrease the overall cooling time.

In another aspect, the present invention provides a novel nozzle for injection of refrigerant into a blow-molded article, comprising a body having a rounded head and an internal bone extending to the rounded head. A V-shaped groove is formed in the outer surface of the rounded head and extends over the crown thereof. A plurality of passageways connect the groove to the internal bone to permit refrigerant fluid in the bone to pass out of the nozzle in a plurality of fan shaped sprays having a pattern corresponding to the location and number of the plurality of passageways.

DESCRIPTION OF PREFERRED EMBODIMENT

Figure 1A:
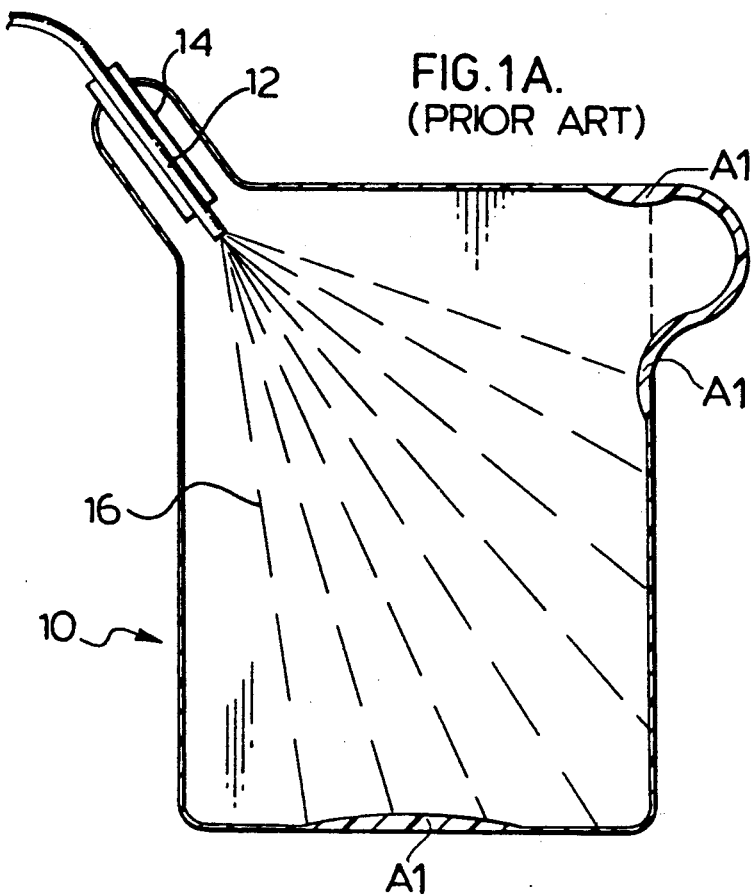
FIGS. 1A and 1B are side and end views respectively of a system commonly-employed for introducing cooling medium to a blow-molded article during cooling.
Figure 1B:
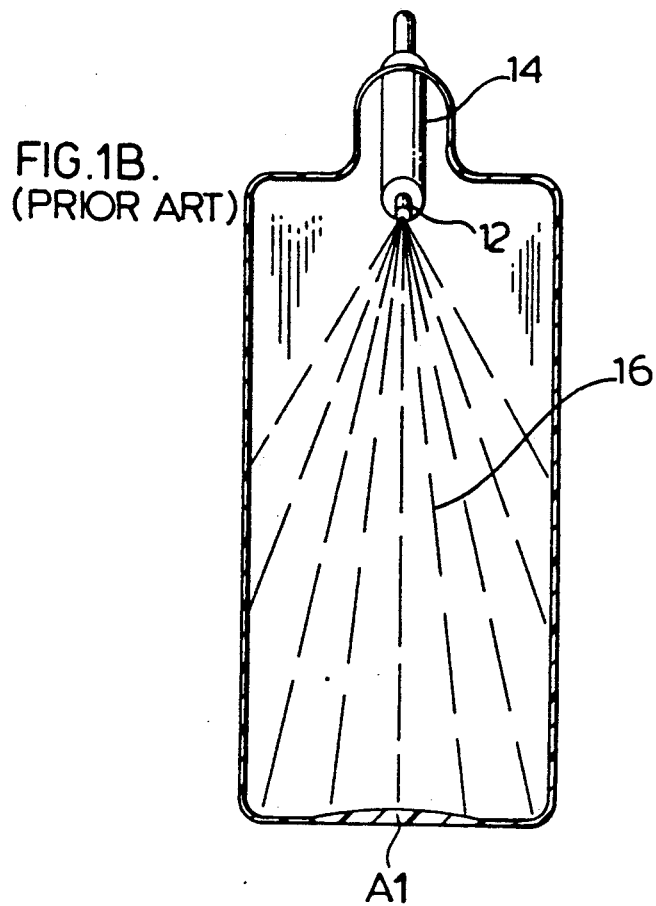

Referring to the drawings, FIG. 1 illustrates a typical prior art procedure for introducing coolant to a blow molded article 10 through a central pipe 12 concentric with the blowing air pipe 14. The pattern 16 of the cooling medium is that of a broad cone, the dimensions of which are defined by well-known fluid-gas relationships.

Figure 2A:
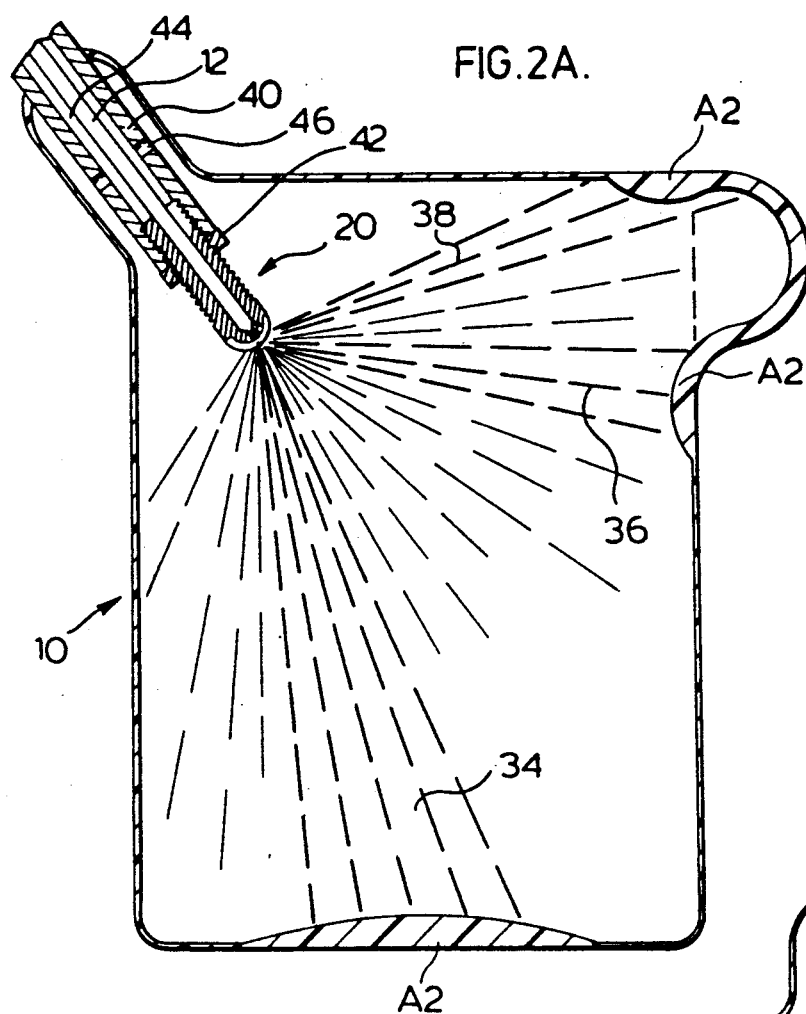
FIGS. 2A and 2B are side and end views respectively of a system for the introduction of cooling medium to a blow-molded article constructed in accordance with one embodiment of this invention.
Figure 2B:
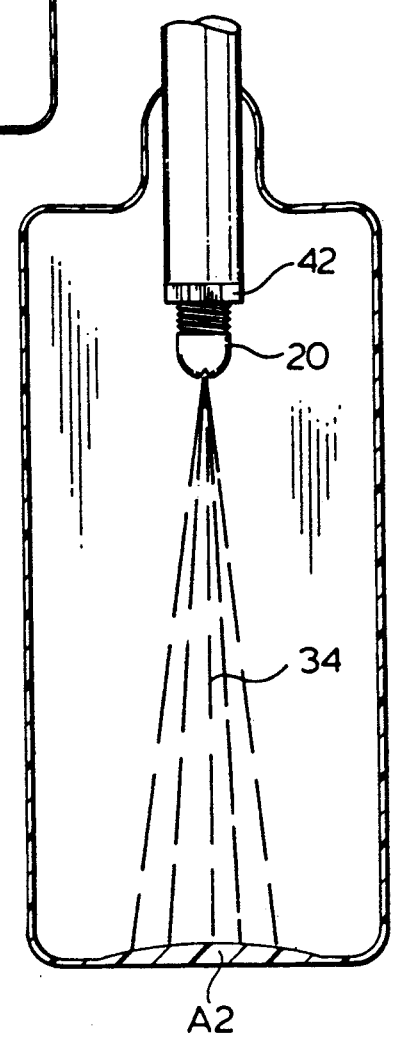

Depending upon the design of the particular article, certain portions of the article represent a limitation to decreasing the cooling time. In FIGS. 1 and 2 respectively, these regions have been designated A1 and A2. The broad cone 16 of cooling medium is largely directed to non-critical areas of the article 10, such as the sidewalls B1, and those portions of the article which should be cooled at a slower rate receive, as a result of their large area, a relatively large fraction of the total cooling. This inefficient use of coolant cannot be readily overcome by the device shown in U.S. Pat. No. 3,488,801, in that the angled end of the injection pipe 12 succeeds only in changing the angle at which the broad cone 16 is directed within the article 10 and does not materially result in a more efficient use of refrigerant.

Figure 3:
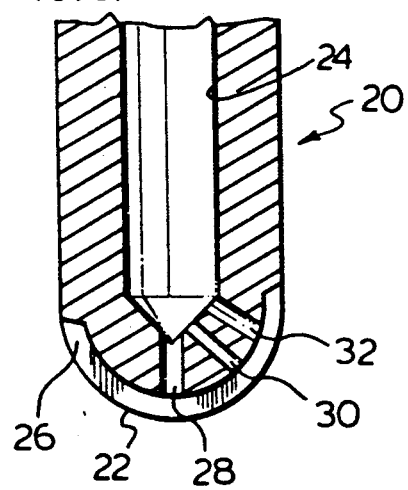
FIG. 3 is a close-up sectional view of one embodiment of nozzle used in the cooling medium of FIGS. 2A and 2B.

Referring now to FIGS. 2 and 3, in accordance with one embodiment of the invention, there is provided a novel coolant spray head 20 connected to the coolant inlet line 12. The spray head 20 is of generally cylindrical shape and has a rounded head 22 and an internal bone 24 communicating with the inlet line 12. The rounded head 22 has a V-shaped groove 26 formed in the surface thereof extending over the crown of the head. These passageways 28, 30 and 32 extend through the head 24 and establish communication with the bone 24 to permit refrigerant to enter the article 10 and act as nozzle. The V-shape of the groove 26 ensures that the refrigerant is in a planar fan spray pattern and also softens the direct blow from the passageways and directs some coolant to areas B1. The passageways 28, 30 and 32 provide specific spray patterns 34, 36 and 38 respectively directed towards the portions A2 of the article 10, which require more rapid cooling in view of their thickness and, at the same time, the flow of coolant towards the other regions, sidewalls including B2, is diminished. Each of the passageways 28, 30 and 32 may be dimensioned to direct only a specific amount of coolant therethrough, thereby further improving the efficiency.

The actual design of spray head 20 and the number and form of the passageways associated therewith varies and is customized for the particular blow molded product that it is desired to cool, and the construction of the same can be readily carried out by a person skilled in the art, knowing the principles of the present invention, as described above. The coolant medium may be any desired material, preferably carbon dioxide or nitrogen.

The spray head 20 is threadedly mounted to the inlet-outlet pipe 40 in communication with the inlet line 12 extending through the pipe 40. The spray head 20 is located in the desired central position by a locking nut 42.

An outlet passage 44 for spent cooling medium is provided communicating with the interior of article 10 through openings 46.

EXAMPLE 5 gallon (20 l) high density polyethylene jerry cans each weighing 3.25 lbs were extruded using a single cavity mold and subsequently cooled using conventional cooling equipment (as seen in FIG. 1) and also using a multipost nozzle as illustrated in FIGS. 2 and 3. The cycle time for production of such jerry cans by the two procedures was determined and the results appear in the following Table:

TABLE

| Procedure | Coolant | Cycle Time (secs) |
|---|---|---|
| Conventional | Air | 57 |
| Conventional | Nitrogen | 46.7 |
| Invention | Nitrogen | 29 |

As can be seen from the data presented in the above Table, by using the multipost nozzle, a considerable decrease in cycle time of 26.5% was achieved.

SUMMARY OF DISCLOSURE

In summary of this disclosure, the present invention provides a novel method of effecting cooling of blown plastic articles by directing coolant in specific locations corresponding to those requiring a greater cooling rate using-nozzle of unique construction, thereby decreasing the overall cooling time for the article. Modifications are possible within the scope of this invention.

What we claim is:

1. A nozzle for injection of refrigerant into a blow-molded article, comprising:
    elongate cylindrical body means having a hemispherically-rounded head at a downstream end thereof in the intended direction of flow of refrigerant therethrough and an elongate internal bore extending from an upstream end of said body means in the intended direction of flow of refrigerant threrethrough to said hemispherically-rounded head,
    a V-shaped groove formed in the outer surface of said hemispherically-rounded head having a uniform depth and a uniform width along its entire length and extending over the entire crown of said hemispherically-rounded had, and
    a plurality of passageways each connecting the base of said groove to said internal bore to permit refrigerant fluid in said bore to pass out of said nozzle in a plurality of fan-shaped sprays having a pattern corresponding to the location and number of said plurality of passageways.

2. The nozzle of claim 1 wherein said elongate cylindrical body means has a screw-threaded outer surface for mounting said nozzle in nozzle holding means.

* * * * *